(12) United States Patent
Hong et al.

(10) Patent No.: US 10,875,431 B2
(45) Date of Patent: Dec. 29, 2020

(54) LUMBAR SUPPORT APPARATUS FOR VEHICLE SEAT

(71) Applicants: HYUNDAI MOTOR COMPANY, Seoul (KR); KIA MOTORS CORPORATION, Seoul (KR)

(72) Inventors: Suk Won Hong, Buncheon-si (KR); Jun Yong Kim, Seoul (KR); Seon Chae Na, Yongin-si (KR); Ji Sun Lee, Hwaseong-si (KR); Chan Ho Jung, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 16/390,649

(22) Filed: Apr. 22, 2019

(65) Prior Publication Data

US 2020/0156521 A1 May 21, 2020

(30) Foreign Application Priority Data

Nov. 15, 2018 (KR) .................. 10-2018-0141044

(51) Int. Cl.
*B60N 2/66* (2006.01)
*B60N 2/68* (2006.01)
(Continued)

(52) U.S. Cl.
CPC ......... *B60N 2/6671* (2015.04); *B60N 2/0252* (2013.01); *B60N 2/366* (2013.01); *B60N 2/66* (2013.01); *B60N 2/68* (2013.01)

(58) Field of Classification Search
CPC ...... B60N 2/6671; B60N 2/0252; B60N 2/66; B60N 2/68; B60N 2/366; B60N 2/64; B60N 2/22
(Continued)

(56) References Cited

U.S. PATENT DOCUMENTS 2,725,921 A * 12/1955 Morris ................. B60N 2/0825
297/216.15
3,929,374 A * 12/1975 Hogan .................. B60N 2/853
297/61
(Continued)

FOREIGN PATENT DOCUMENTS

DE      102018005827 A1 * 1/2019  ............... B60N 2/66
EP           2301796 A2 * 3/2011  ............... B60N 2/66
(Continued)

*Primary Examiner* — Milton Nelson, Jr.
(74) *Attorney, Agent, or Firm* — Morgan, Lewis & Bockius LLP

(57) ABSTRACT

A lumbar support apparatus for a vehicle seat includes: a seatback frame having an adjustable inclination angle; an operating mechanism disposed at an upper portion of the seatback frame, the operating mechanism including a connector generating an operating force in a vertical direction by being in contact with a fixture fixed to a vehicle body when the inclination angle of the seatback frame is adjusted; and a support mechanism disposed at a lower portion of the seatback frame, connected to the connector, receiving the operating force generated from the connecting mechanism, and configured to slide in a front and rear direction depending on an application direction of the operating force, such that when the inclination angle of the seatback frame is adjusted to be directed rearward, the support mechanism receives the operating force of the operating mechanism and is advanced forward to support a waist of an occupant.

15 Claims, 11 Drawing Sheets

(51) Int. Cl.
  *B60N 2/36*  (2006.01)
  *B60N 2/02*  (2006.01)
(58) Field of Classification Search
  USPC .................................................. 297/284.8
  See application file for complete search history.

(56) References Cited

U.S. PATENT DOCUMENTS

| | | | | | |
|---|---|---|---|---|---|
| 5,558,399 | A | * | 9/1996 | Serber | B60N 2/4221 |
| | | | | | 297/216.1 |
| 6,641,214 | B2 | * | 11/2003 | Veneruso | B60N 2/0232 |
| | | | | | 297/216.15 |
| 7,086,700 | B2 | * | 8/2006 | Habedank | B60N 2/986 |
| | | | | | 297/378.1 |
| 7,967,382 | B2 | * | 6/2011 | Pyun | B60N 2/3011 |
| | | | | | 297/284.9 |
| 2015/0008707 | A1 | * | 1/2015 | Erhel | B60N 2/75 |
| | | | | | 297/188.14 |
| 2015/0336478 | A1 | * | 11/2015 | Mitsuhashi | B60N 2/2218 |
| | | | | | 296/65.09 |

FOREIGN PATENT DOCUMENTS

| | | | |
|---|---|---|---|
| JP | 63232046 A | * 9/1988 | ............... B60N 2/66 |
| JP | 3941975 B2 | 4/2007 | |
| KR | 10-0781115 B1 | 11/2007 | |
| KR | 10-0836344 B1 | 6/2008 | |

* cited by examiner

LUMBAR SUPPORT APPARATUS FOR VEHICLE SEAT

CROSS REFERENCE TO RELATED APPLICATION

The present application claims priority to Korean Patent Application No. 10-2018-0141044, filed Nov. 15, 2018 in the Korean Intellectual Property Office, the entire contents of which is incorporated herein for all purposes by this reference.

TECHNICAL FIELD

The present disclosure relates to a lumbar support apparatus for a vehicle seat supporting a waist of an occupant.

BACKGROUND

In general, a vehicle has a seat therein for a driver or passenger, and which includes a seat cushion and a seatback.

An angle of the seatback can be generally adjusted forward and rearward according to a body size or a posture of an occupant. When the seatback is inclined rearward, the bottom of the occupant is moved forward and therefore the waist of the occupant would be apart from the seatback when viewed from the side. Thus, the waist of the occupant is not supported by the seatback. Further, in a case where the occupant is sitting in a vehicle for a long time, since the waist of the occupant is not supported by the seatback, the occupant feels uncomfortable in his/her waist.

Recently, a lumbar support protruding from the inside of a seatback outwardly of the seatback is available to support a waist of an occupant.

However, the lumbar support of the related art simply has a shape protruding from the inside of a seatback toward a waist of an occupant, which makes the occupant feel uncomfortable. In addition, when the seatback is inclined rearward, the waist of the occupant is not supported by the seatback. Moreover, since the lumbar support protruding from the seatback has a fixed length, the occupant feels uncomfortable or the waist of the occupant is not sufficiently supported by the lumbar support, resulting in deterioration of effective lumbar support.

The contents described as the related art have been provided only to assist in understanding the background of the present disclosure and should not be considered as corresponding to the related art known to those having ordinary skill in the art.

SUMMARY

An object of the present disclosure is to provide a lumbar support apparatus for a vehicle seat in which a protruding distance of a lumbar support which supports a waist of an occupant is adjusted depending on adjustment of an angle of a seatback, such that the waist of the occupant is comfortably supported according to a posture of the occupant depending on the angle of the seatback.

According to an embodiment of the present disclosure, a lumbar support apparatus for a vehicle seat, includes: a seatback frame having an adjustable inclination angle; an operating mechanism disposed at an upper portion of the seatback frame and including a connector generating an operating force in a vertical direction by being in contact with a fixture fixed to a vehicle body when the inclination angle of the seatback frame is adjusted; and a support mechanism disposed at a lower portion of the seatback frame, connected to the connector, receiving the operating force generated from the connecting mechanism, configured to slide in a front and rear direction depending on an application direction of the operating force, such that when the inclination angle of the seatback frame is adjusted to be directed rearward, the support mechanism receives the operating force of the operating mechanism and is advanced forward to support a waist of an occupant.

The lumbar support apparatus may further include: a latch mechanism installed at the upper portion of the seatback frame, selectively coupled to the fixture fixed to the vehicle body, and fixing a position of the seatback frame of which the inclination angle is adjusted.

The latch mechanism may include: an operating portion installed on the seatback frame, connected to a latch wire, and generating a pulling force on the latch wire according to a vertical operation; and a latch portion connected to the latch wire of the operating portion, installed on the seatback frame to be rotatable, and selectively coupled to the fixture.

The operating portion may be disposed above the latch portion, and when the operating portion is operated, as the latch wire is pulled upwards, the latch portion may be rotated and separated from the fixture.

The latch portion may be provided with a plurality of latch grooves spaced apart from each other in the front and rear direction, the latch groove being depressed to allow the fixture to be inserted thereinto.

The operating mechanism may include: a bracket portion installed at the upper portion of the seatback frame and including a fixed pulley; a guide portion installed in the bracket portion and including a guide slit extending in a longitudinal direction; and a moving portion installed in the guide slit of the guide portion to be slidable and formed to be hooked to the fixture, and the connector may be provided to be wound around the fixed pulley of the bracket portion and extend to have one end connected to the moving portion and the other end connected to the support mechanism.

The bracket portion may be disposed under the fixture, the fixed pulley and the guide portion may protrude upwards, and the other end of the connector wound around the fixed pulley may extend toward the support mechanism through the bracket portion.

The moving portion may include a sliding portion slidably connected to the guide slit and a hooked portion mounted in the sliding portion to be rotatable by a predetermined distance and extending to be hooked to the fixture.

The sliding portion may include a fixed protrusion spaced apart from the central point of rotation of the hooked portion, and catching protrusions corresponding to the fixed protrusion of the sliding portion formed at the central point of rotation of the hooked portion.

The support mechanism may include: a rotating link portion installed at the lower portion of the seatback frame to be rotatable with a link connection structure, connected to the connector, and having a length varying in the front and rear direction according to generation of the operating force of the connector; and a support panel formed to have an area and having a rear surface connected to the rotating link portion so that the support panel is moved in the front and rear direction depending on a length varying operation of the rotating link portion.

The rotating link portion may include a first link rotatably connected to the seatback frame and a second link rotatably connected to the rear surface of the support panel, and the first link and the second link are rotatably connected to each other.

The connector may be connected to the central point of rotation at which the first link and the second link are rotatably connected to each other.

The support mechanism may further include a support portion installed at the lower portion of the seatback frame, extending forward, and including a support slit formed in an extending direction, and the rear surface of the support panel may be formed with a support link slidably connected to the support slit of the support portion The support portion may be fixed to the seatback frame, extend forward, and extend upwards and diagonally so that the support slit extends diagonally.

The rotating link portion may be disposed in the center of the support panel, and a pair of support portions may be spaced apart from each other based on the rotating link portion and connected to a pair of support links of the support panel, respectively.

DETAILED DESCRIPTION OF THE EMBODIMENTS

Hereinafter, a lumbar support apparatus for a vehicle seat according to exemplary embodiments of the present disclosure will be described with reference to the accompanying drawings.

Figure 1:
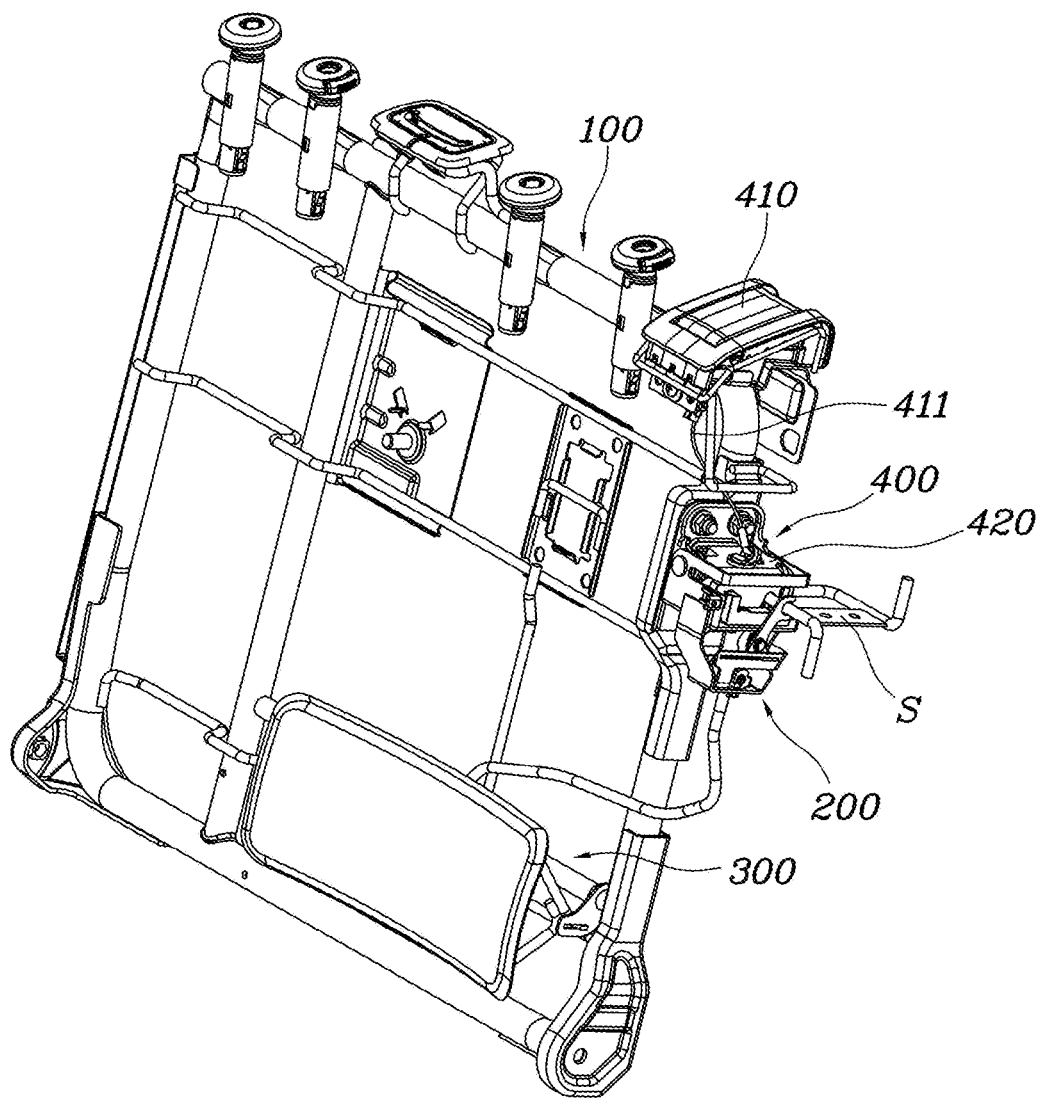
FIGS. 1 and 2 are views illustrating a lumbar support apparatus for a vehicle seat according to an exemplary embodiment of the present disclosure.
Figure 2:
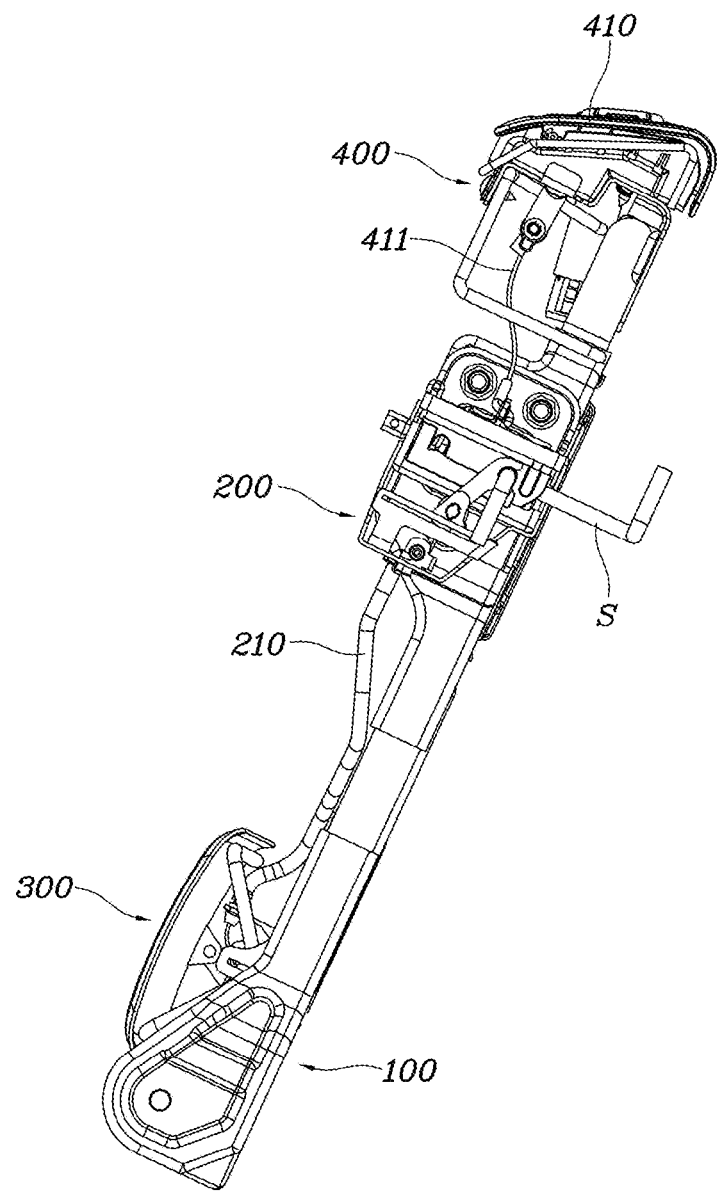

FIGS. 1 and 2 are views illustrating a lumbar support apparatus for a vehicle seat according to an exemplary embodiment of the present disclosure, and FIGS. 3 to 11 are views for describing the lumbar support apparatus for a vehicle seat illustrated in FIG. 1.

As illustrated in FIGS. 1 and 2, a lumbar support apparatus for a vehicle seat according to the present disclosure includes: a seatback frame 100 having an adjustable inclination angle; an operating mechanism 200 provided at an upper portion of the seatback frame 100 and including a connector 210 generating an operating force in a vertical direction by being in contact with a fixture S fixed to a vehicle body when the inclination angle of the seatback frame 100 is adjusted; and a support mechanism 300 provided at a lower portion of the seatback frame 100, connected to the connector 210, receiving the operating force generated from the connecting mechanism 200, configured to slide in a front and rear direction depending on an application direction of the operating force to be located at a changed position, such that when the inclination angle of the seatback frame 100 is adjusted rearward, the support mechanism receives the operating force of the operating mechanism 200 and is advanced forward to support a waist of an occupant.

Here, the seatback frame 100 may be rotatably connected to a seat cushion frame and the inclination angle of the seatback frame 100 may be adjusted in a stepwise manner. In addition, the fixture S may be used as a striker fixed to the vehicle body. In a case where the fixture S is used as a striker, the operating mechanism 200 and the support mechanism 300 are operated depending on the inclination angle of the seatback frame 100 and the fixture S is operated together with a latch mechanism 400 to be described below, such that it is possible to fix the position of the seatback frame 100 and change the position of the support mechanism 300 with only the fixture S. Accordingly, it is possible to simplify the entire structure of the lumbar support apparatus and reduce manufacturing cost.

The seatback frame 100 may be applied to a rear seat of a vehicle, and a multi-stage latch may be installed to the seatback frame 100. Therefore, an inclination angle of the seatback frame 100 may be adjusted in a plurality of stages. Since such a structure of the multi-stage latch is published through various known literatures, description of the detailed structure is omitted.

The seatback frame 100 includes the operating mechanism 200 and the support mechanism 300. The connector 210 connects the operating mechanism 200 and the support mechanism 300 to each other so that both mechanisms are operated together. In this case, the connector 210 may be a wire. That is, when the inclination angle of the seatback frame 100 is adjusted and the operating mechanism 200 is pushed by being in contact with the fixture S fixed to the vehicle body, the connector 210 is pulled and generates an operating force. Such an operating force is transferred to the support mechanism 300 through the connector 210. The support mechanism 300 is slid in a front and rear direction by receiving the operating force, and the position thereof is changed, thereby supporting the waist of the occupant.

Therefore, in the present disclosure, when the inclination angle of the seatback frame 100 is adjusted rearward, the operating mechanism 200 is moved by the fixture S and the connector 210 generates operating force. The support mechanism 300 connected to the connector 210 receives the operating force and is advanced forward. As a result, the waist of the occupant is supported. In addition, when the inclination angle of the seatback frame 100 is adjusted, the operating mechanism 200 is operated together with the support mechanism 300. Thus, the user convenience is enhanced.

The present disclosure described above will be described in detail with reference to FIGS. 1, 3, and 4. The lumbar support apparatus may further include a latch mechanism 400 installed at the upper portion of the seatback frame 100, selectively coupled to the fixture S fixed to the vehicle body, and fixing a position of the seatback frame 100 of which the inclination angle is adjusted. In this case, the fixture S may be served as a striker. The latch mechanism 400 installed on the seatback frame 100 is coupled to the fixture S so as to fix the position of the seatback frame 100.

In detail, the latch mechanism 400 may include: an operating portion 410 installed on the seatback frame 100, connected to a latch wire 411, and generating a pulling force on the latch wire 411 according to a vertical operation; and a latch portion 420 connected to the latch wire 411 of the operating portion 410, installed on the seatback frame 100 to be rotatable, and selectively coupled to the fixture S.

In addition, the operating portion 410 is disposed above the latch portion 420, and when the operating portion 410 is operated, as the latch wire 411 is pulled upwards, the latch portion 420 may be rotated and separated from the fixture S.

Further, the latch portion 420 may include a plurality of latch grooves 421 spaced apart from each other in the front and rear direction, the latch groove being depressed to allow the fixture S to be inserted thereinto.

As illustrated in FIG. 1, the operating portion 410 may be a lever type which can be operated by an occupant. When the operating portion 410 is pulled by the occupant, as the latch wire 411 connected to the operating portion 410 is moved upwards, a pulling force is generated. As the latch portion 420 connected to the latch wire 411 is rotated upwards by the pulling force, the fixture S is separated from one of the latch grooves 421, thus a coupling state between the fixture S and the latch groove 421 is released. After the inclination angle of the seatback frame 100 is adjusted, the latch portion 420 is returned to the original position, and when the fixture S is inserted into the other latch groove 421, the fixture S and the latch groove 421 are into the coupling state. To this end, as illustrated in FIG. 3, the latch portion 420 may be returned to the original portion through a spring, and a return force of the spring which acts on the latch portion 420 also acts on the operating portion 410 through the latch wire 411. Therefore, the operating portion 410 may also be returned to the original portion.

Referring to FIGS. 3 to 6, the operating mechanism 200 may include: a bracket portion 220 installed at the upper portion of the seatback frame 100 and including a fixed pulley 221; a guide portion 230 installed in the bracket portion 220 and including a guide slit 231 extending in a longitudinal direction; and a moving portion 240 installed in the guide slit 231 of the guide portion 230 to be slidable and formed to be hooked to the fixture S. The connector 210 may be provided to be wound around the fixed pulley 221 of the bracket portion 220 and may extend to have one end connected to the moving portion 240 and the other end connected to the support mechanism 300.

Figure 5:
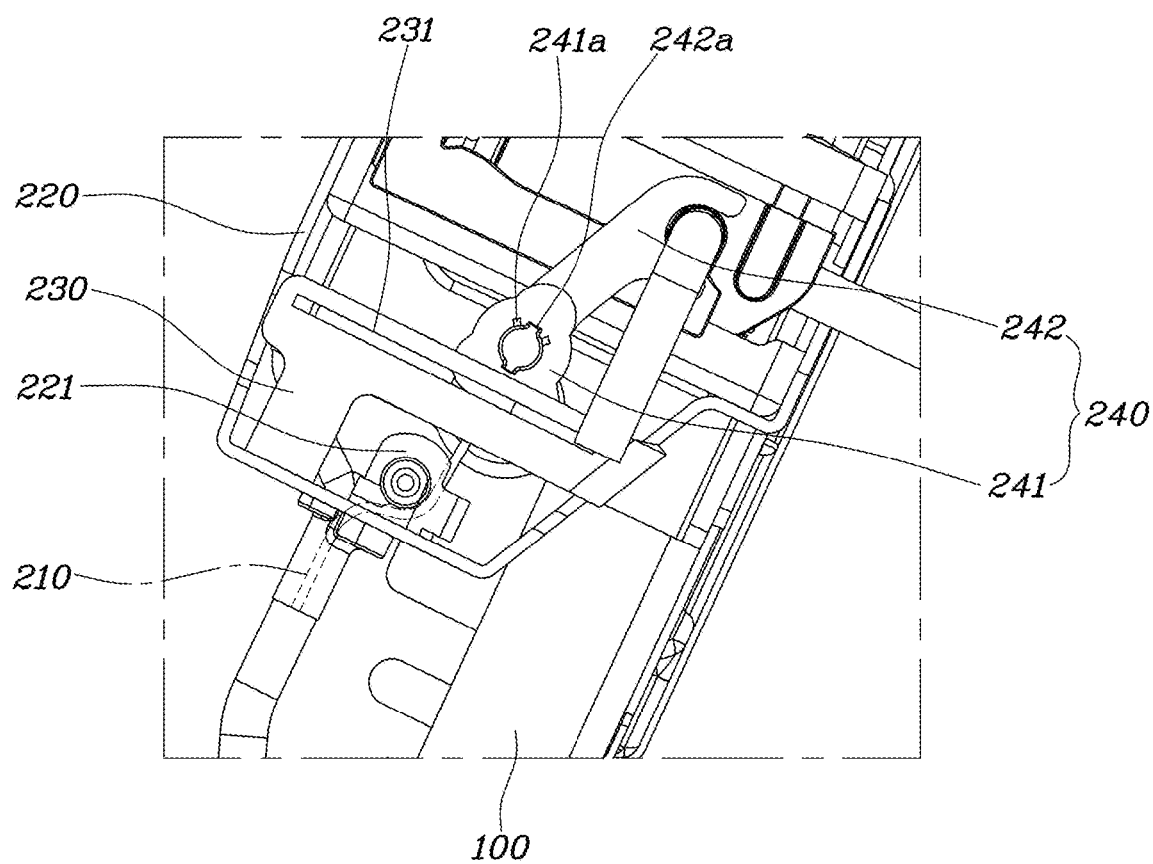
Figure 6:
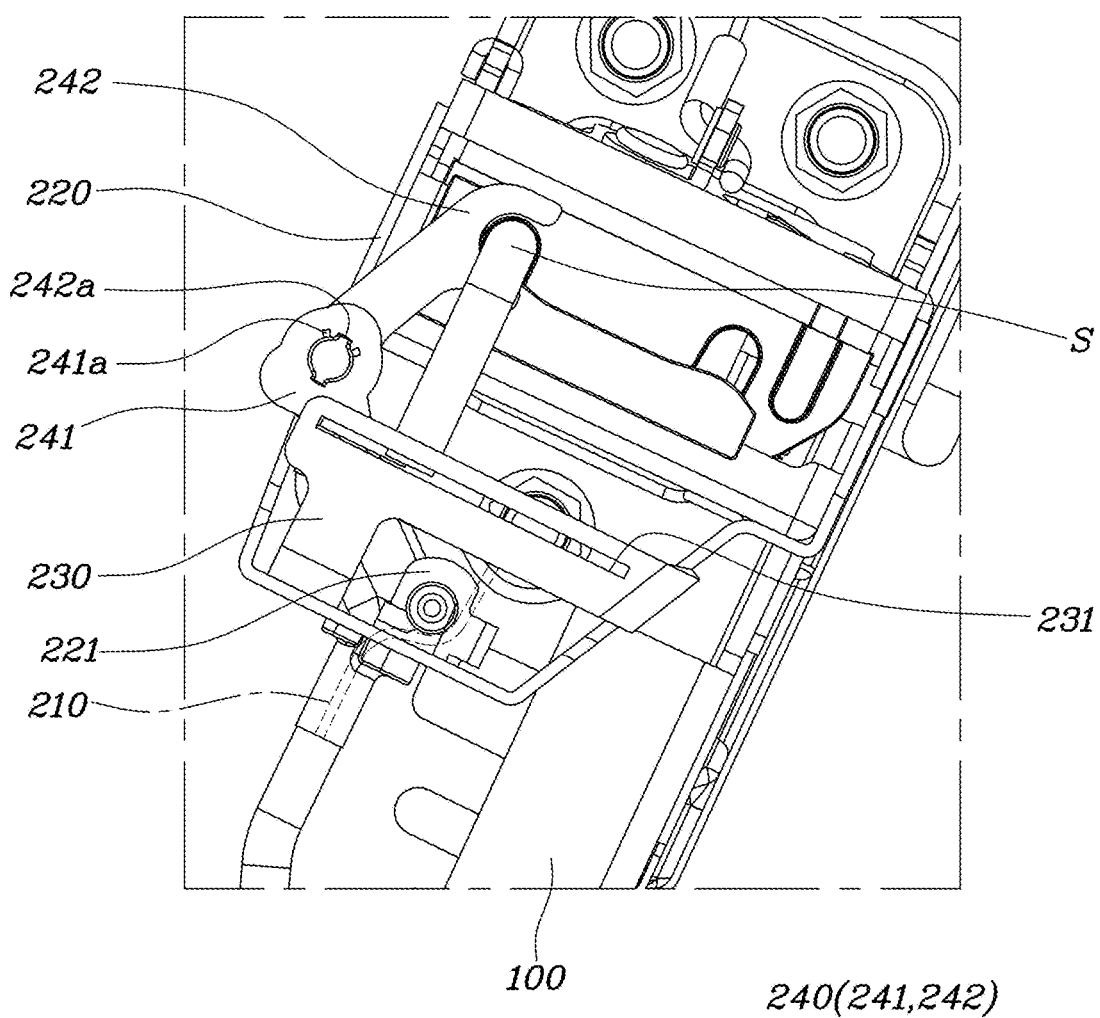

As a result, as illustrated in FIGS. 5 and 6, when the inclination angle of the seatback frame 100 is adjusted, the moving portion 240 is pushed by being in a contact with the fixture S and moved along the guide slit 231 of the guide portion 230. The connector 210 being moved along with the moving portion 240 is supported on the fixed pulley 221 famed in the bracket portion 220, therefore an operating force is generated by a distance in which the moving portion 240 is moved. As a result, the operating force is applied to the support mechanism 300 connected to the connector 210, and the support mechanism 300 is slid in a front and rear direction and the position thereof may be changed.

Figure 3:
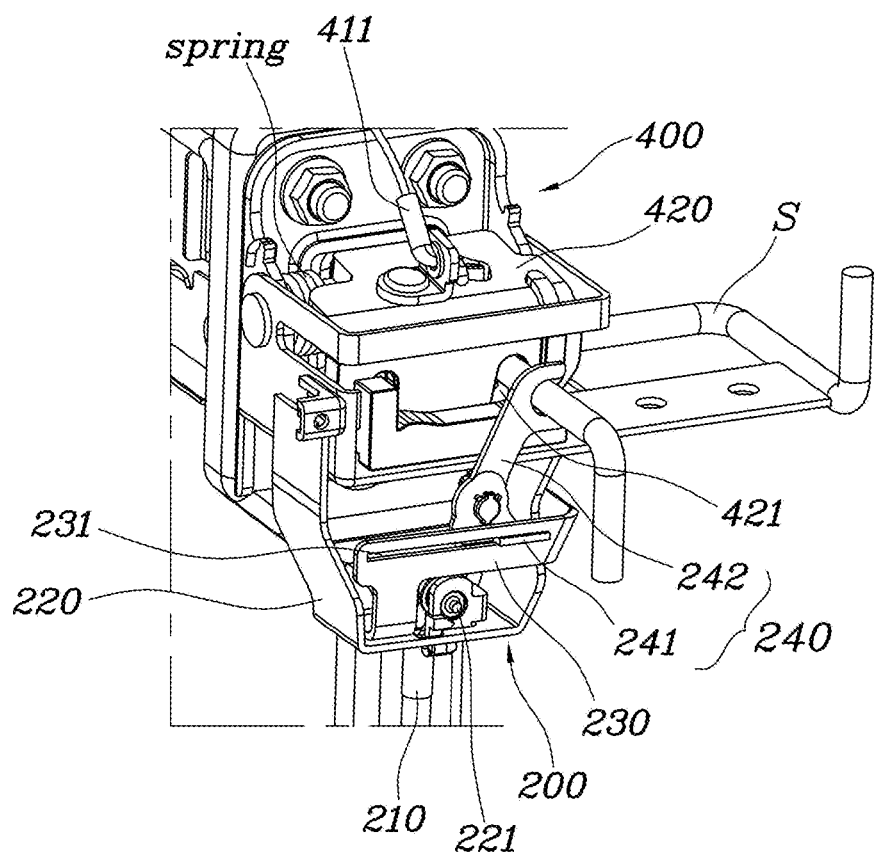
FIGS. 3 to 11 are views for describing the lumbar support apparatus for a vehicle seat illustrated in FIG. 1.

As illustrated in FIG. 3, the bracket portion 220 of the operating mechanism 200 is disposed under the fixture S, the fixed pulley 221 and the guide portion 230 protrude upwards, and the other end of the connector 210 wound around the fixed pulley 221 may extend toward the support mechanism 300 through the bracket portion 220.

Therefore, the latch mechanism 400 and the bracket portion 220 are operated without interference with each other due to the fixture S. Since the connector 210 wound around the fixed pulley 221 extends through the bracket portion 220, that is, the fixed pulley 221 and the connector 210 are positioned inside the bracket portion 220, it is possible for the fixed pulley 221 and the connector 210 to avoid interference with the vehicle body or the seatback frame 100 and to be smoothly operated.

In addition, the moving portion 240 may include a sliding portion 241 slidably connected to the guide slit 231 and a hooked portion 242 mounted in the sliding portion 241 to be rotatable by a predetermined distance and extending to be hooked to the fixture S.

In this case, the sliding portion 241 is folioed in a bar shape so as to move straightly in the guide slit 231 and mounted in the guide slit 231. Further, since the hooked portion 242 rotatably mounted in the sliding portion 241, when the hooked portion 242 is in contact with the fixture S due to the rotation of the seatback frame 100, the hooked portion 242 is rotated in the sliding portion 241 and a clearance between the hooked portion 242 and the fixture S, which enables a smooth operation.

The sliding portion 241 may include a fixed protrusion 241*a* spaced apart from the central point of rotation of the hooked portion 242, and catching protrusions 242*a* corresponding to the fixed protrusion 241*a* of the sliding portion 241 formed at the central point of rotation of the hooked portion 242. Therefore, a degree of rotation of the hooked portion 242 in the sliding portion 241 may be restricted.

That is, because the hooked portion 242 needs to be positioned to correspond to the fixture S, the catching protrusion 242*a* of the hooked portion 242 is in contact with the fixed protrusion 241*a* of the sliding portion 241 so that a rotation position of the hooked portion 242 may be positioned to correspond to the fixture S. In addition, when the seatback frame 100 is rotated and the hooked portion 242 is in contact with the fixture S, since the catching protrusion 242*a* of the hooked portion 242 is in contact with the fixed protrusion 241*a* of the sliding portion 241 and the rotation position of the hooked portion 242 is fixed, the hooked portion 242 and the sliding portion 241 are smoothly slid in the guide slit 231.

As illustrated in FIGS. 7 to 10, the support mechanism 300 of the present disclosure may include: a rotating link portion 310 installed at the lower portion of the seatback frame 100 to be rotatable with a link connection structure, connected to the connector 210, and having a length varying in the front and rear direction according to generation of the operating force of the connector 210; and a support panel 320 formed to have an area and having a rear surface connected to the rotating link portion 310 so that the support panel 320 is moved in the front and rear direction depending on a length varying operation of the rotating link portion 310.

As described above, the support mechanism 300 includes the rotating link portion 310 and the support panel 320. When the rotating link portion 310 receives the operating force of the connector 210 and then the length thereof varies, the support panel 320 is advanced or returned to the original position depending on a length varying operation of the rotating link portion 310.

Accordingly, the rotating link portion 310 is installed to be rotatable with a link connection structure, and is operated to become wider or narrower by the operating force of the connector 210. Therefore, the length of the rotating link portion 310 varies. In addition, the support panel 320 may be provided at the lower portion of the seatback frame 100 and disposed around the waist of the occupant. The support panel 320 may be folioed to have an area so as to support the waist of the occupant.

Figure 8:
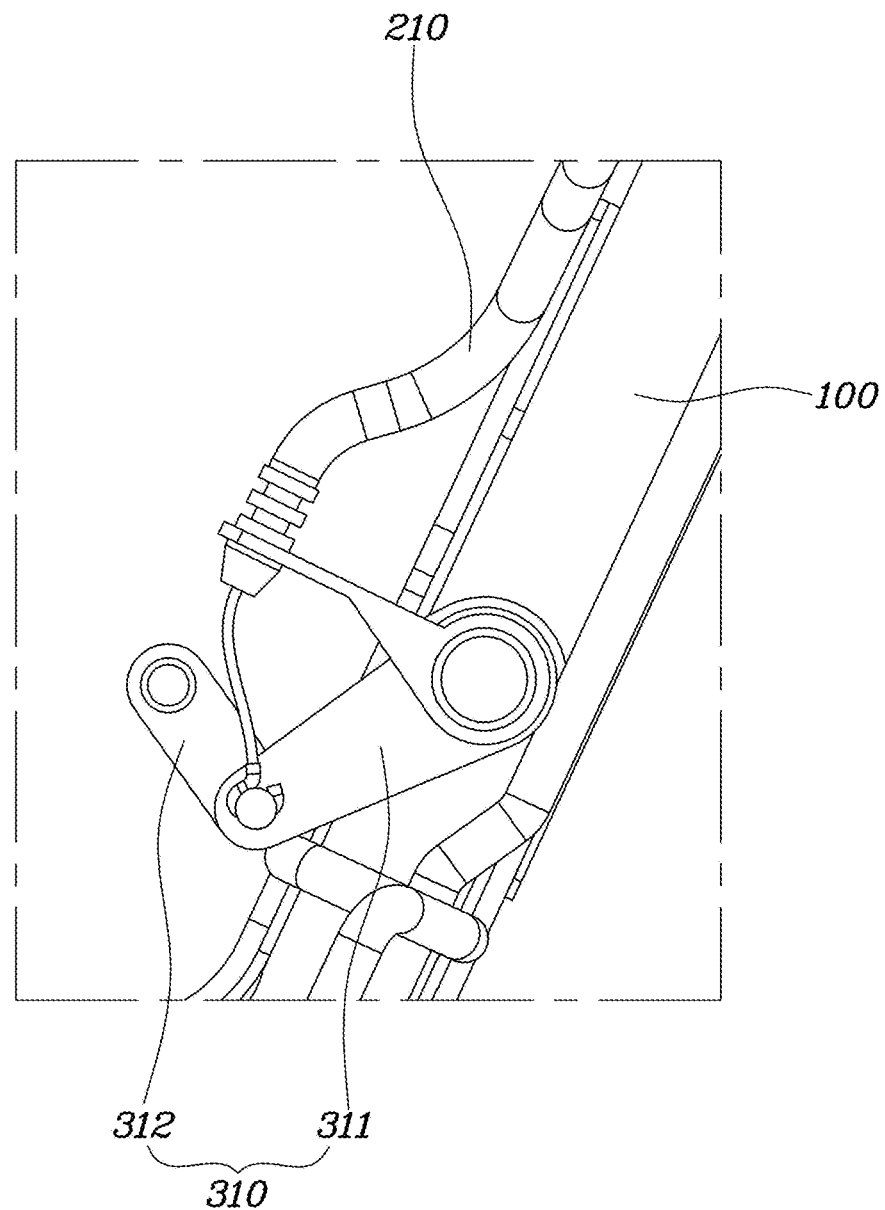
Figure 9:
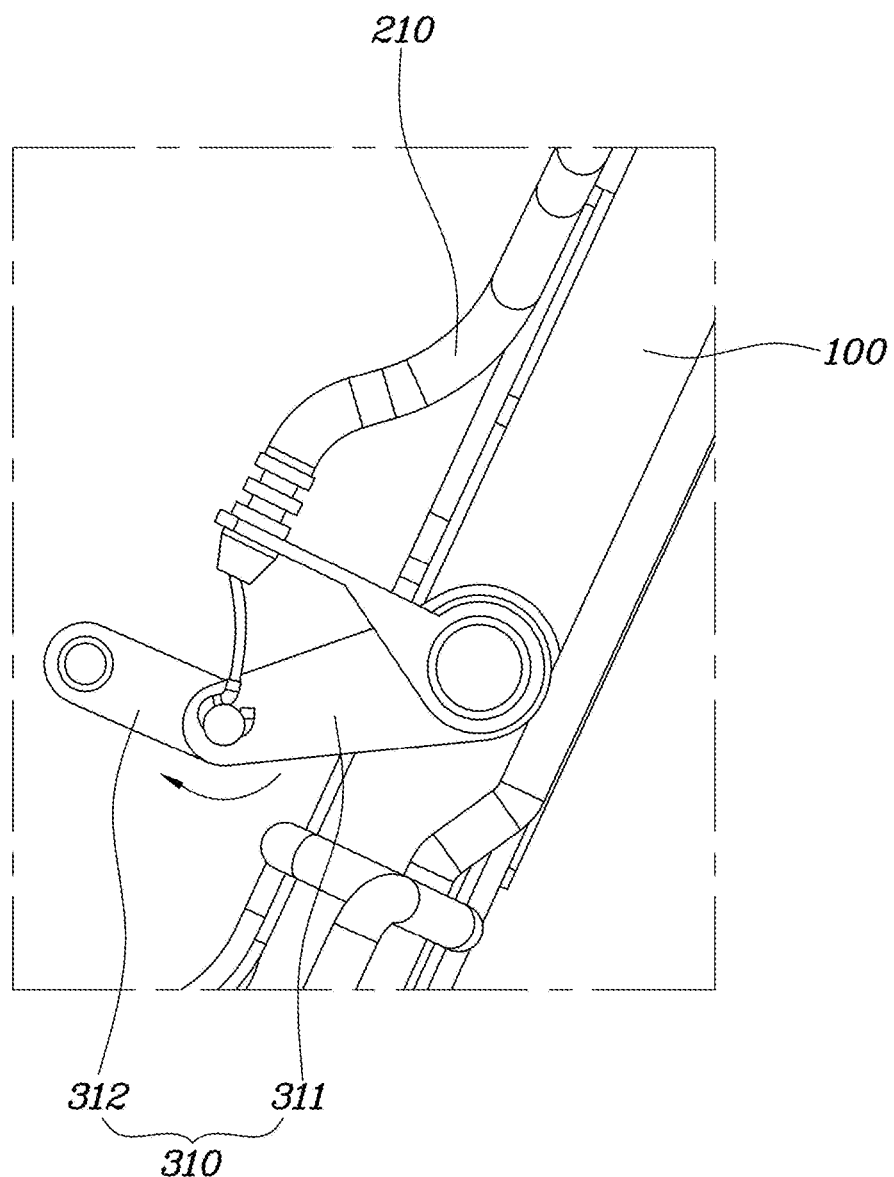

In detail, as illustrated in FIG. 8 or 9, the rotating link portion 310 includes a first link 311 rotatably connected to the seatback frame 100 and a second link 312 rotatably connected to the rear surface of the support panel 320. The first link 311 and the second link 312 are rotatably connected to each other. Here, the connector 210 is connected to the central point of rotation at which the first link 311 and the second link 312 are rotatably connected to each other. Therefore, the first link 311 and the second link 312 may become wider rapidly by the connector 210.

As such, the rotating link portion 310 includes the first link 311 and the second link 312 which are rotatably connected to each other, and when the operating force is transferred from the connector 210, as the first link 311 and the second link 312 become wider, the length of the rotating link portion 310 is increased, such that the support panel 320 may be advanced.

That is, initially, as illustrated in FIG. 8, as the first link 311 and the second link 312 become narrower to each other, the length of the rotating link portion 310 is decreased in the front and rear direction. As illustrated in FIG. 9, in the case where as the seatback frame 100 is rotated, the operating mechanism 200 is operated by the fixture S and the connector 210 generates an operating force, the first link 311 and the second link 312 are pulled upwards by the connector 210. Therefore, the first link 311 and the second link 312 become wider and the length of the rotating link portion 310 is increased in a front and rear direction. As a result, the support panel 320 connected to the second link 312 is advanced forward.

Figure 7:
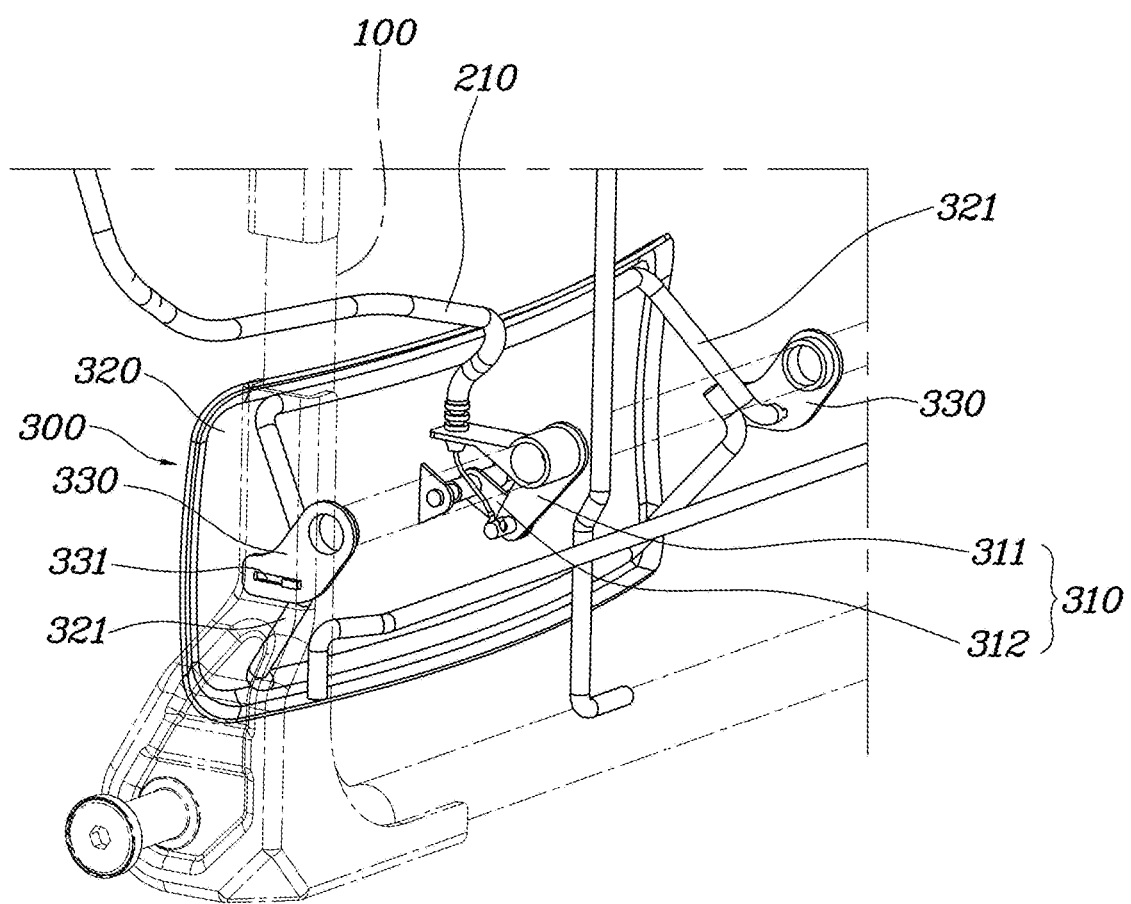
Figure 10:
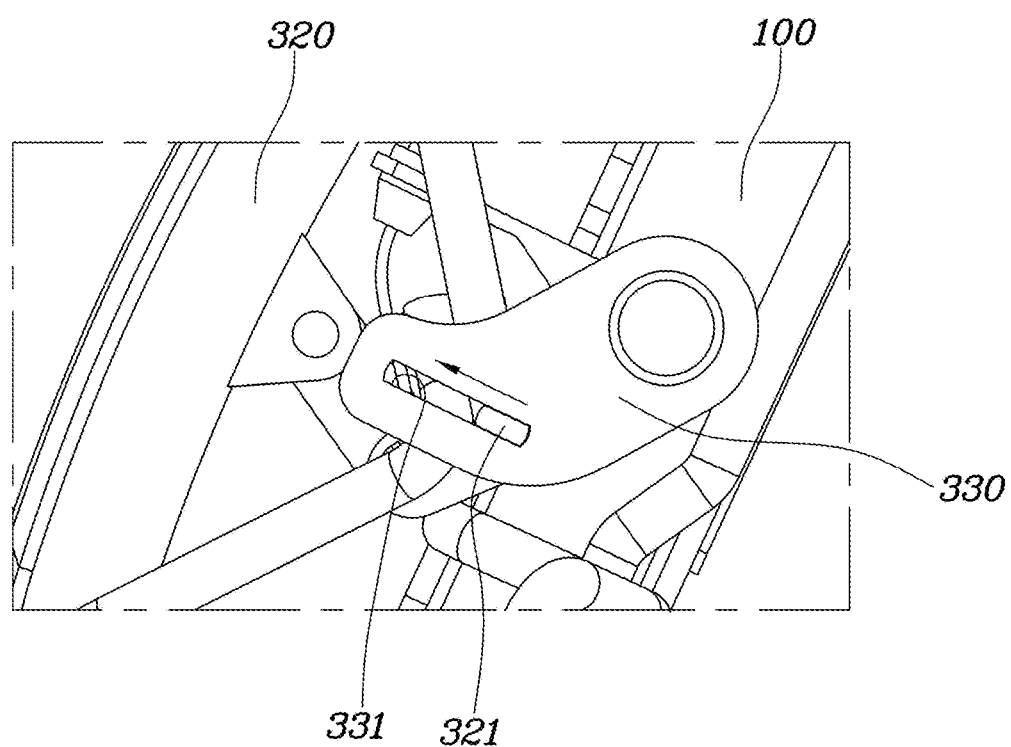

As illustrated in FIGS. 7 and 10, the support mechanism 300 may further include a support portion 330 installed at the lower portion of the seatback frame 100, extending forward, and including a support slit 331 formed in an extending direction. The rear surface of the support panel 320 is formed with a support link 321 slidably connected to the support slit 331 of the support portion 330.

The support portion 330 allows the support panel 320 to straightly advance toward the waist of the occupant when the support panel 320 is advanced and allows the support panel 320 to be firmly installed in the seatback frame 100. As a result, the support link 321 formed on the rear surface of the support panel 320 is moved along the support slit 331 of the support portion 330 which is installed at the lower portion of the seatback frame 100 so that the waist of the occupant is comfortably supported.

Here, the support portion 330 is fixed to the seatback frame 100, extends forward, and extends upwards and diagonally so that the support slit 331 may extend diagonally. That is, when the inclination angle of the seatback frame 100 is adjusted rearward, the support mechanism 300 of the present disclosure needs to be in contact with the waist of the occupant, in a case where only the support panel 320 is advanced forward, the waist of the occupant is not stably supported. Accordingly, as the support portion 330 extends diagonally, the support panel 320 which is moved along the support slit 331 is advanced forward and upwards. Therefore, the waist of the occupant is stably supported in a state in which the inclination angle of the seatback frame 100 is adjusted rearward.

The rotating link portion 310 is disposed in the center of the support panel 320, and a pair of support portions 330 are spaced apart from each other based on the rotating link portion 310 and connected to a pair of support links 321 of the support panel 320, respectively.

That is, the rotating link portion 310 is disposed in the center of the support panel 320 so that a force acts on the support panel 320 without bias when the support panel 320 is advanced. The pair of support portions 330 are spaced apart from each other based on the rotating link portion 310 of the support panel 320, such that the support panel 320 is firmly fixed by the pair of support portions 330. As a result, the durability of the support mechanism 300 is improved.

An operation of the present disclosure described above will be described below. It will be described that the operation of the seatback frame 100 is performed in first/second stages.

FIG. 2 illustrates the state of the lumbar support apparatus for a vehicle seat when the inclination angle of the seatback frame 100 is in a first stage. That is, as illustrated in FIG. 3, the fixture S is fixed to the latch portion 420 of the latch mechanism 400 by being inserted into the latch groove 421 and as illustrated in FIG. 5, the moving portion 240 of the operating mechanism 200 is disposed behind the guide portion 230. FIG. 8 illustrates the state in which the first link 311 and the second link 312 of the rotating link portion 310 of the support mechanism 300 are overlapped with each other. As illustrated in FIG. 10, the support link 321 of the support panel 320 is disposed behind the support slit 331 of the support portion 330.

In the state described above, when the operating portion 410 of the latch mechanism 400 is operated, as the latch portion 420 of the latch mechanism 400 is rotated upwardly and separated from the fixture S, the seatback frame 100 is in a rotatable state. Thereafter, the inclination angle of the seatback frame 100 may be changed into a second stage.

Figure 4:
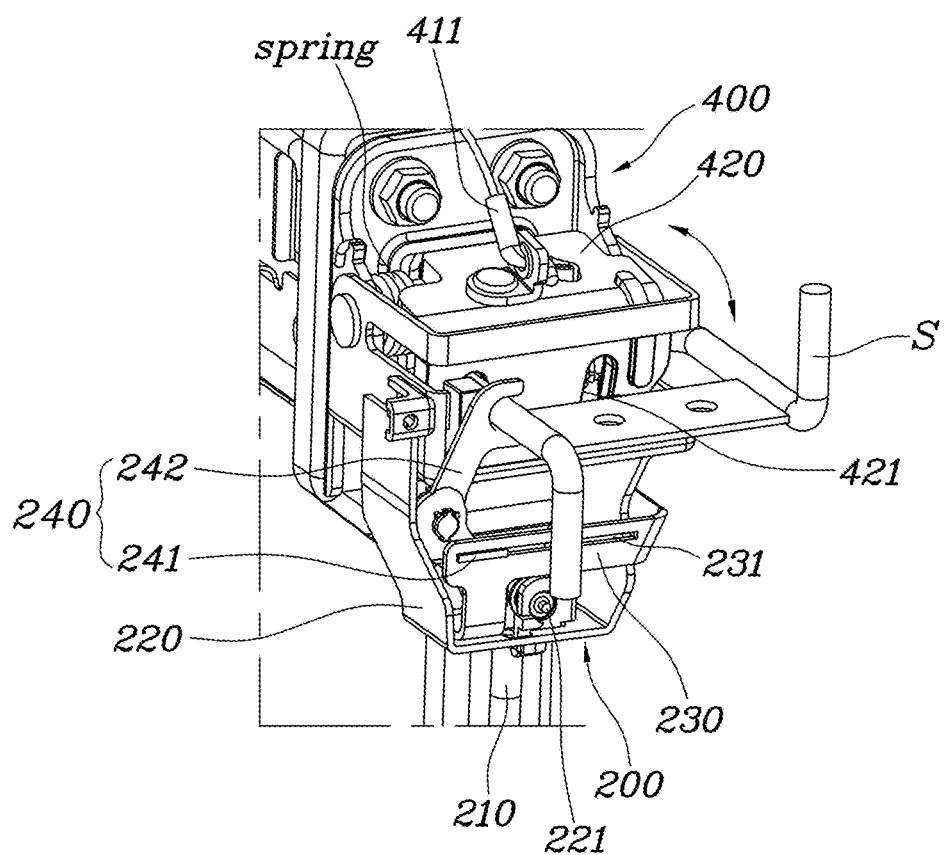

At this time, as illustrated in FIG. 4, as the fixture S is fixed to the latch portion 420 of the latch mechanism 400 by being inserted into the other latch groove 421, the rotation position of the seatback frame 100 is fixed, and the moving portion 240 of the operating mechanism 200 is moved in front of the guide portion 230, as illustrated in FIG. 6. Accordingly, the connector 210 connected to the moving portion 240 is pulled forward based on the fixed pulley 221 and the pulling force of the connector 210 acts on the first link 311 and the second link 312 of the rotating link portion 310. Therefore, as illustrated in FIG. 9, the first link 311 and the second link 312 of the rotating link portion 310 of the support mechanism 300 become wider by the pulling force of the connector 210, and the support link 321 of the support panel 320 is moved along the support slit 331 of the support portion 330.

Figure 11:
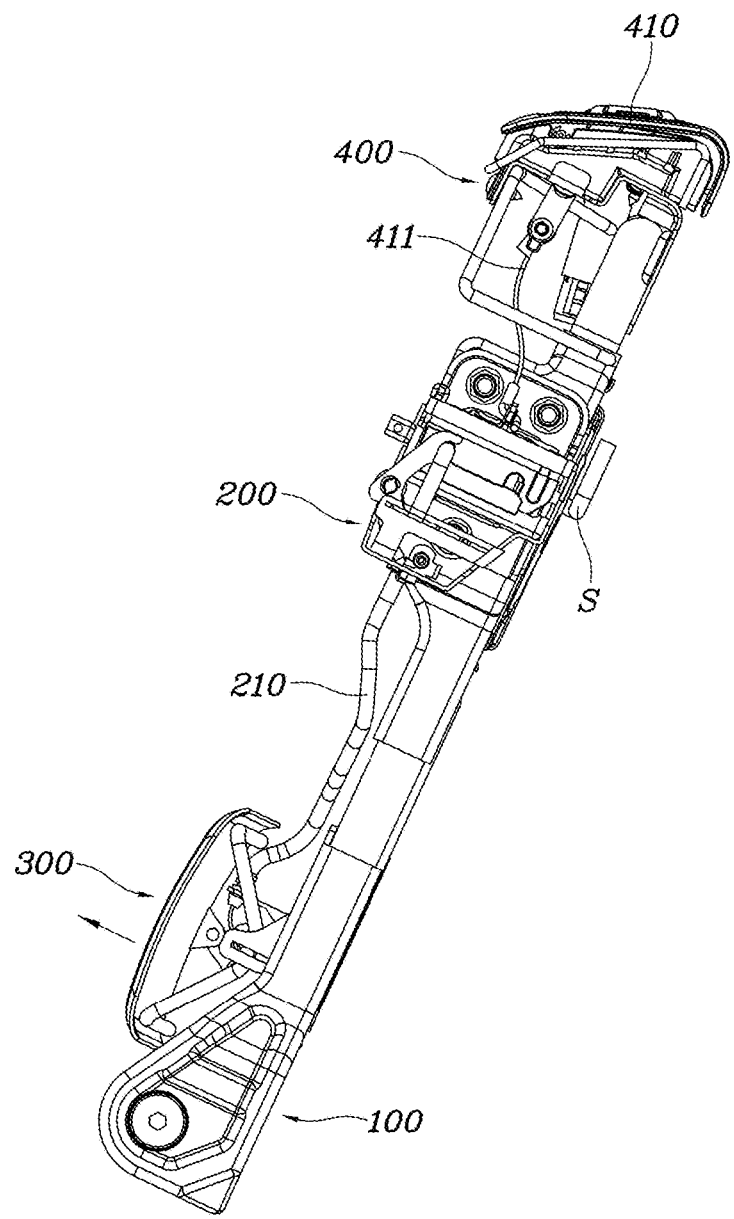

As a result, referring to FIG. 11, the support panel 320 is advanced forward and diagonally and in contact with the waist of the occupant, such that the waist of the occupant is comfortably supported.

In the lumbar support apparatus for a vehicle seat having the structure as described above, as the angle of the seatback is adjusted, a protruding length of the lumbar support is adjusted by being operated together with the striker, such that the waist of the occupant is comfortably and automatically supported according to a posture of the occupant depending on the angle of the seatback.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A lumbar support apparatus for a vehicle seat, comprising:
   a seatback frame having an adjustable inclination angle;
   an operating mechanism disposed at an upper portion of the seatback frame, the operating mechanism including a connector generating an operating force in a vertical direction by being in contact with a fixture fixed to a vehicle body when the inclination angle of the seatback frame is adjusted; and
   a support mechanism disposed at a lower portion of the seatback frame, connected to the connector, receiving the operating force generated from the connector, and configured to slide in a front and rear direction depending on an application direction of the operating force, such that when the inclination angle of the seatback frame is adjusted to be directed rearward, the support mechanism receives the operating force of the operating mechanism and is advanced forward to support a waist of an occupant.

2. The lumbar support apparatus of claim 1, further comprising a latch mechanism at the upper portion of the seatback frame, selectively coupled to the fixture fixed to the vehicle body, and fixing a position of the seatback frame of which the inclination angle is adjusted.

3. The lumbar support apparatus of claim 2, wherein the latch mechanism includes:
an operating portion installed on the seatback frame, connected to a latch wire, and generating a pulling force on the latch wire according to a vertical operation; and
a latch portion connected to the latch wire of the operating portion, rotatably disposed on the seatback frame, and selectively coupled to the fixture.

4. The lumbar support apparatus of claim 3, wherein the operating portion is disposed above the latch portion, and
when the operating portion is operated in the vertical direction, the latch wire is pulled upwards and the latch portion is rotated and separated from the fixture.

5. The lumbar support apparatus of claim 3, wherein the latch portion includes a plurality of latch grooves spaced apart from each other in the front and rear direction, the latch groove being depressed to allow the fixture to be inserted thereinto.

6. The lumbar support apparatus of claim 1, wherein the operating mechanism includes:
a bracket portion disposed at the upper portion of the seatback frame and including a fixed pulley;
a guide portion disposed in the bracket portion and including a guide slit extending in a longitudinal direction; and
a moving portion disposed in the guide slit of the guide portion to be slidable and hooked to the fixture, and
wherein the connector is wound around the fixed pulley of the bracket portion and extends to have a first end connected to the moving portion and a second end connected to the support mechanism.

7. The lumbar support apparatus of claim 6, wherein the bracket portion is disposed under the fixture, the fixed pulley and the guide portion protrude upwards, and the second end of the connector wound around the fixed pulley extends toward the support mechanism through the bracket portion.

8. The lumbar support apparatus of claim 6, wherein the moving portion includes:
a sliding portion slidably connected to the guide slit; and
a hooked portion mounted in the sliding portion to be rotatable by a predetermined distance and extending to be hooked to the fixture.

9. The lumbar support apparatus of claim 8, wherein the sliding portion includes:
a fixed protrusion spaced apart from a center of rotation of the hooked portion; and
a catching protrusion corresponding to the fixed protrusion of the sliding portion.

10. The lumbar support apparatus of claim 6, wherein the support mechanism includes:
a rotating link portion disposed at the lower portion of the seatback frame to be rotatable with a link connection structure, connected to the connector, and having a length varying in the front and rear direction according to generation of the operating force of the connector; and
a support panel having a rear surface connected to the rotating link portion so that the support panel is moved in the front and rear direction depending on the length of the rotating link portion.

11. The lumbar support apparatus of claim 10, wherein the rotating link portion includes a first link rotatably connected to the seatback frame and a second link rotatably connected to the rear surface of the support panel, and
the first link and the second link are rotatably connected to each other.

12. The lumbar support apparatus of claim 11, wherein the connector is connected to a central point of rotation at which the first link and the second link are rotatably connected to each other.

13. The lumbar support apparatus of claim 10, wherein the support mechanism further includes a support portion installed at the lower portion of the seatback frame, extending forward, and including a support slit formed in an extending direction, and
the rear surface of the support panel has a support link slidably connected to the support slit of the support portion.

14. The lumbar support apparatus of claim 13, wherein the support portion is fixed to the seatback frame, extends forward, and extends upwards and diagonally so that the support slit extends diagonally.

15. The lumbar support apparatus of claim 13, wherein the rotating link portion is disposed in a center of the support panel, and a pair of support portions are spaced apart from each other based on the rotating link portion and connected to a pair of support links of the support panel, respectively.

* * * * *